United States Patent [19]

Whitney et al.

[11] Patent Number: 4,701,130
[45] Date of Patent: Oct. 20, 1987

[54] SOFTWARE TRAINING SYSTEM

[75] Inventors: David R. Whitney, Burlingame; Ronald B. Whitney, San Carlos, both of Calif.

[73] Assignee: Access Learning Technology Corporation, San Mateo, Calif.

[21] Appl. No.: 914,797

[22] Filed: Oct. 2, 1986

Related U.S. Application Data

[63] Continuation of Ser. No. 690,785, Jan. 11, 1985, Pat. No. 4,637,797.

[51] Int. Cl.$^4$ .............................................. G09B 19/00
[52] U.S. Cl. .................................... 434/118; 434/335
[58] Field of Search .............................. 434/118, 335

[56] References Cited

U.S. PATENT DOCUMENTS 4,464,124  8/1984  Romero et al. .................... 434/335
4,622,013  11/1986  Cerchio ............................. 434/118

Primary Examiner—Leo P. Picard
Attorney, Agent, or Firm—Flehr, Hohbach, Test, Albritton & Herbert

[57] ABSTRACT

There is described a software training system including a computer, a cassette tape player system, and software for running the computer. This software includes the target program which the student is learning to use and courseware which defines a multiplicity of events which correspond to different portions of a predefined training lesson.

The tape player system is attached by an interface to one of the computer's ports. The interface allows the computer to turn the tape player unit on and off, and also transmits keystroke data from the left track of a stereo cassette which is mounted in the tape player to the computer. Oral instructions or other sounds recorded on the right track of the stereo cassette are played over a speaker. The training system works by alternately turning on the tape to give the student oral instructions and to get keystroke from data from the tape, and then turning off the tape player while the student enters keystrokes, for use in the target software program, which follow the oral instructions previously given.

The keystrokes entered by the student are compared with a filter specified by the currently active event in the courseware. If a correct entry is made, the tape player is turned back on and the lesson continues. Certain predefined keystrokes from the tape player cause a new event from the courseware to be selected and for the tape player to be turned off. Furthermore, if the student fails to make the correct keystrokes within a preselected time period the training system enters the correct answer for him and proceeds with the next portion of the training session.

12 Claims, 14 Drawing Figures

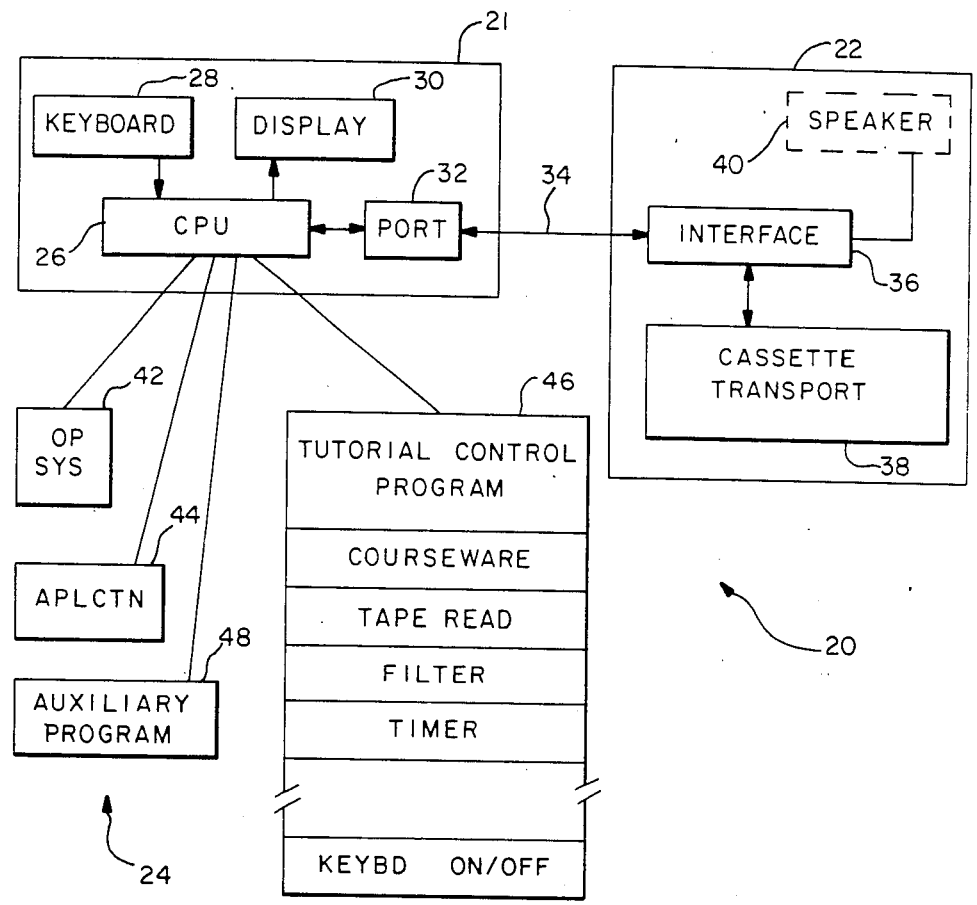
FIG. — 1
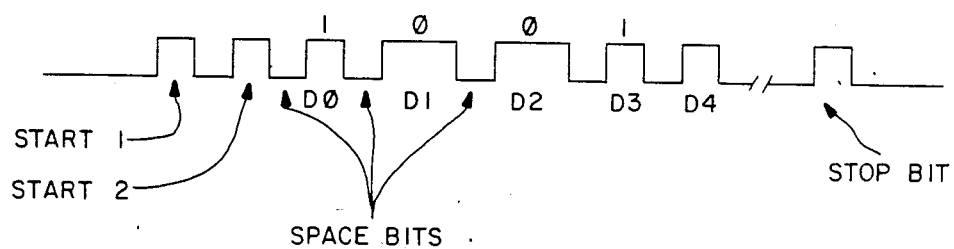
FIG. — 2

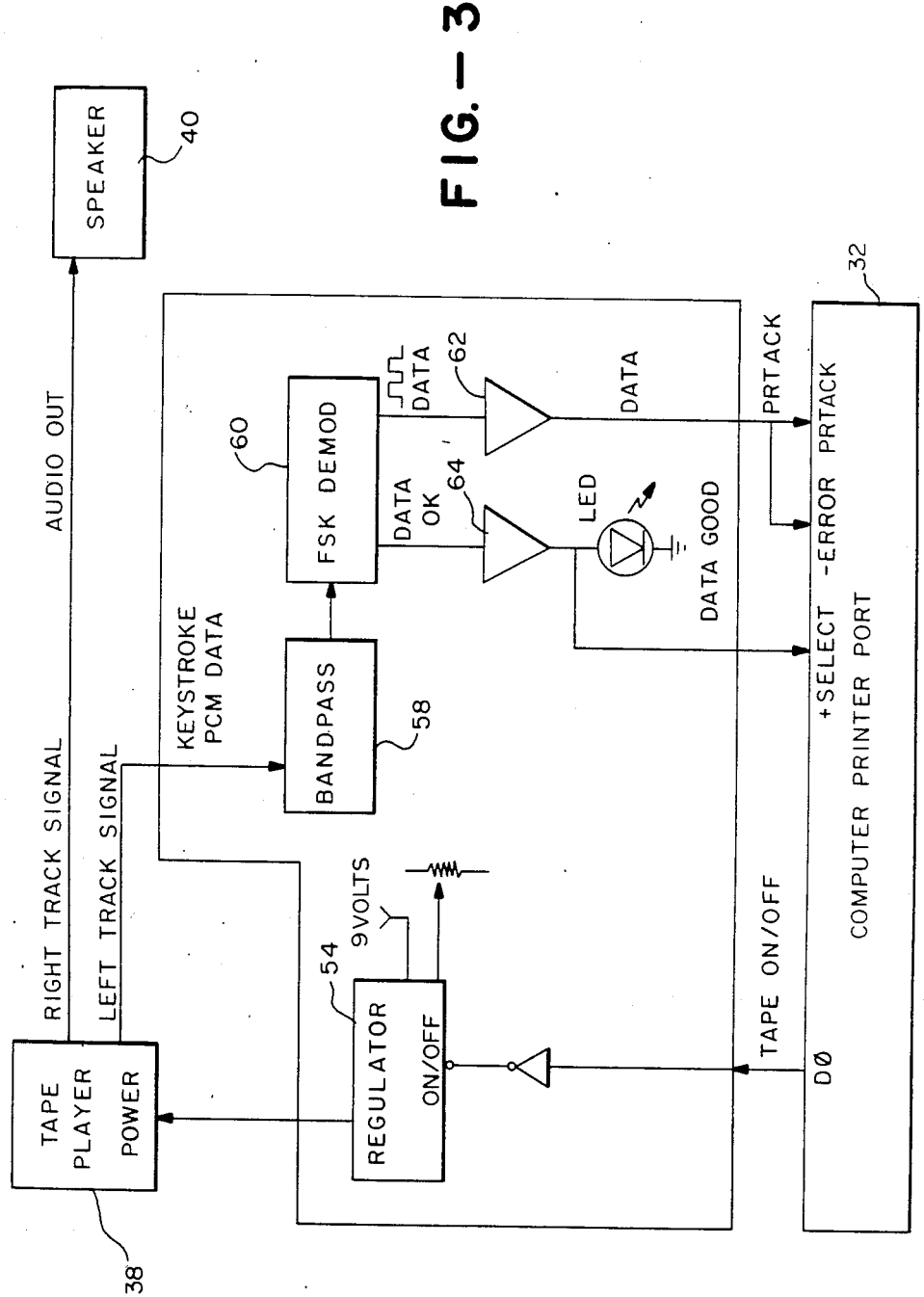

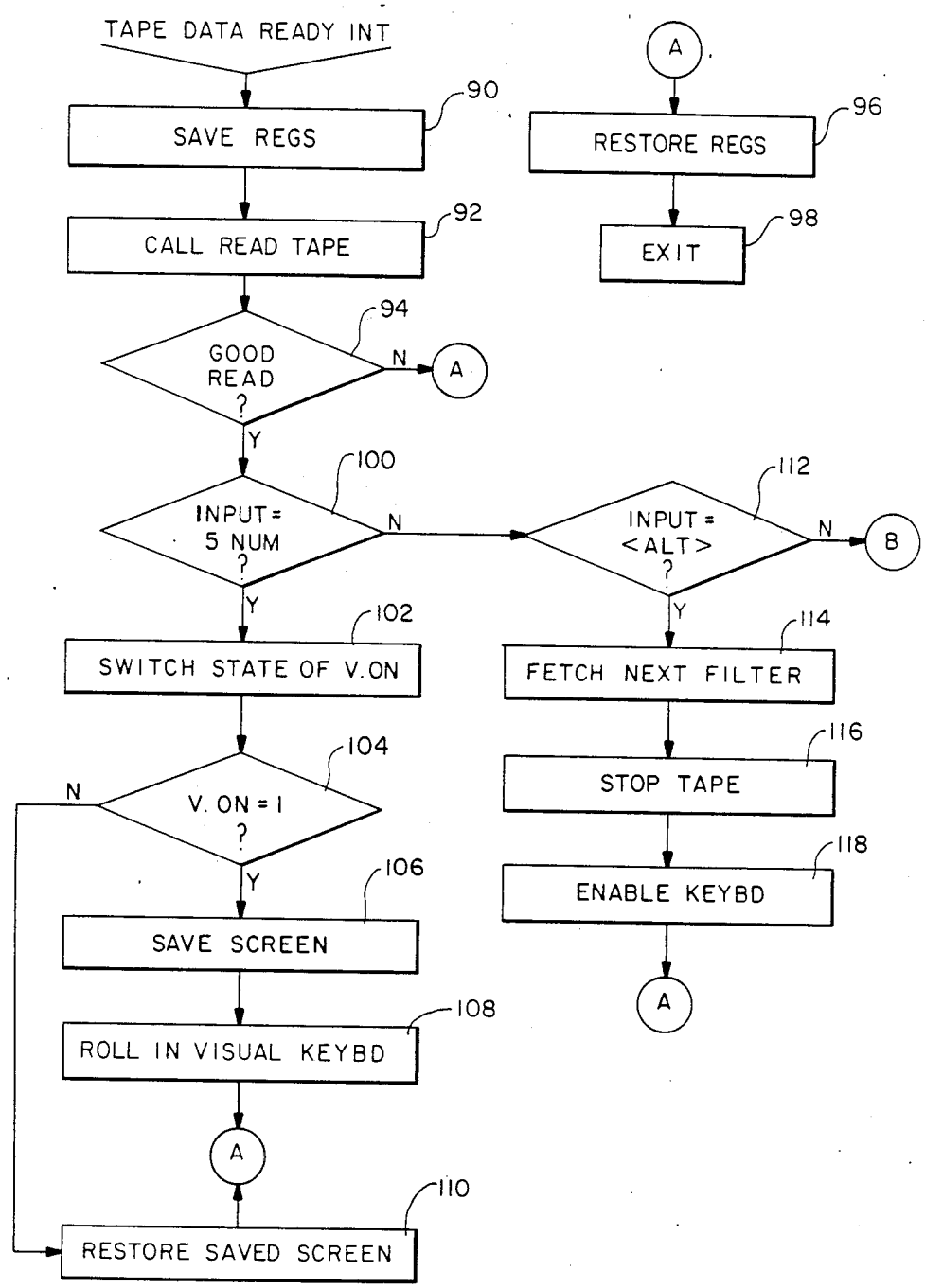
FIG.—5A

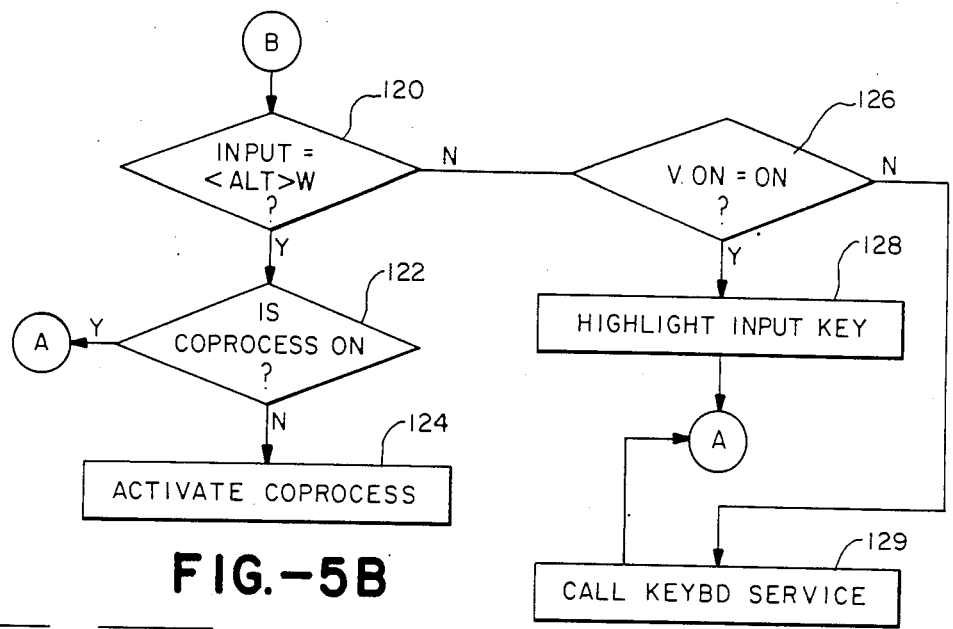
FIG.-5B
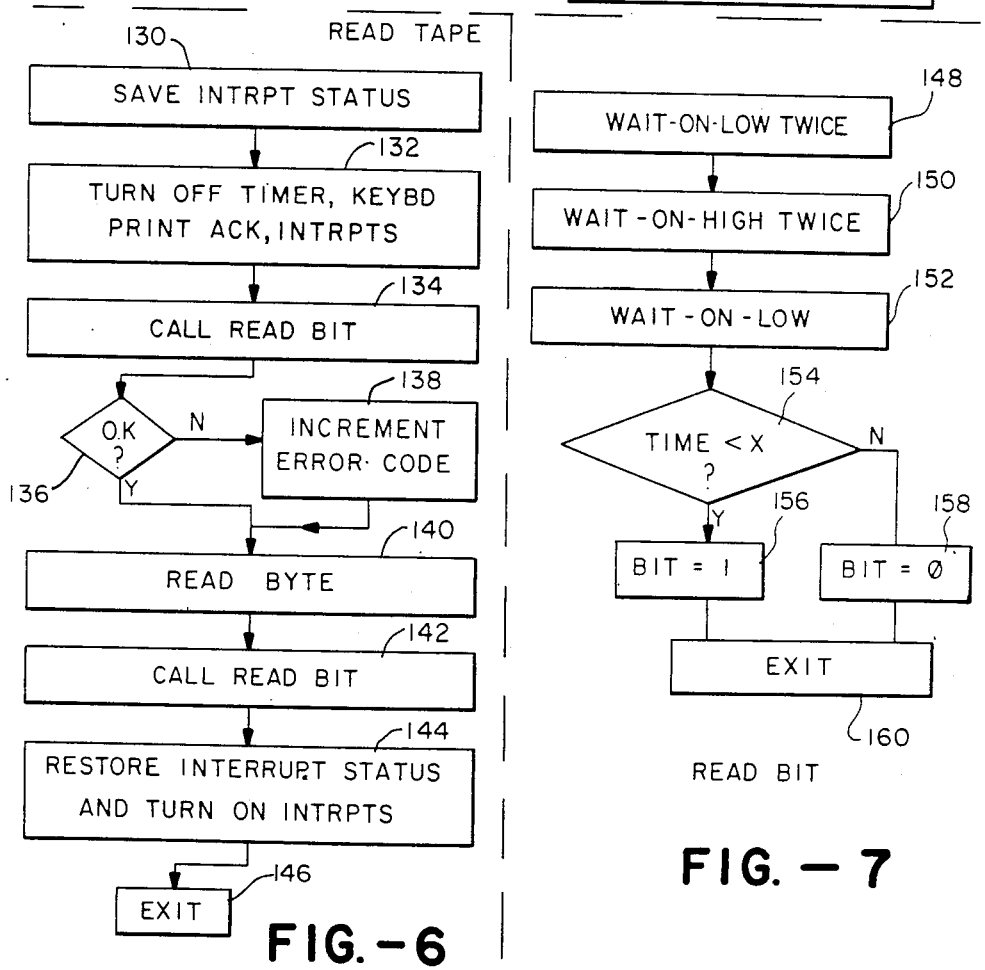
FIG.-6
FIG.-7

FIG. —8

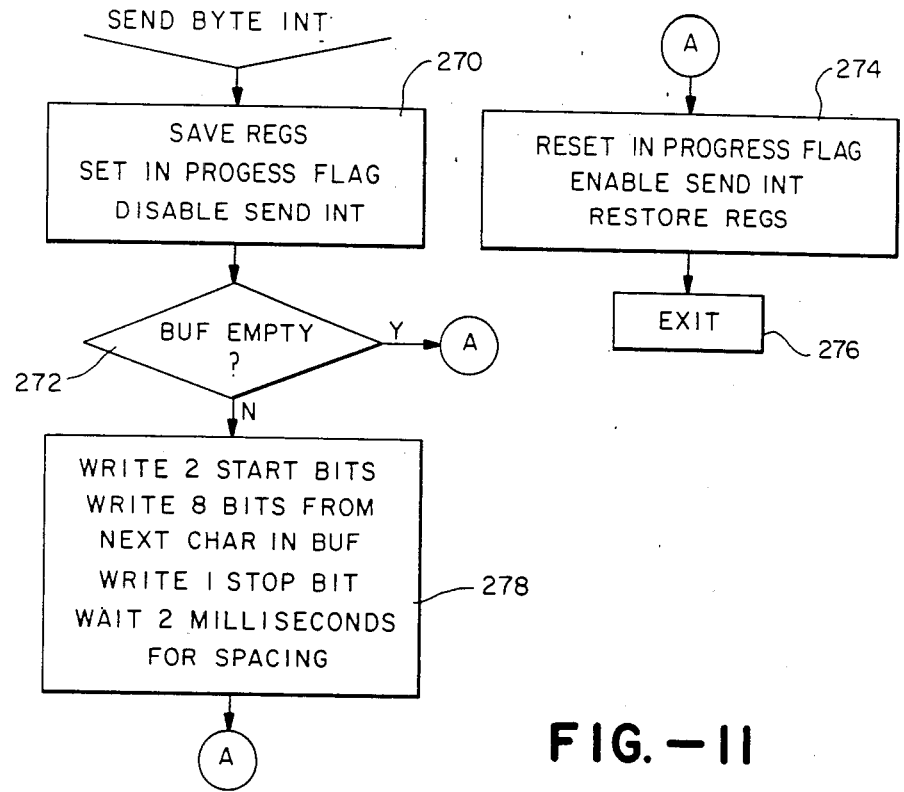
FIG.—11
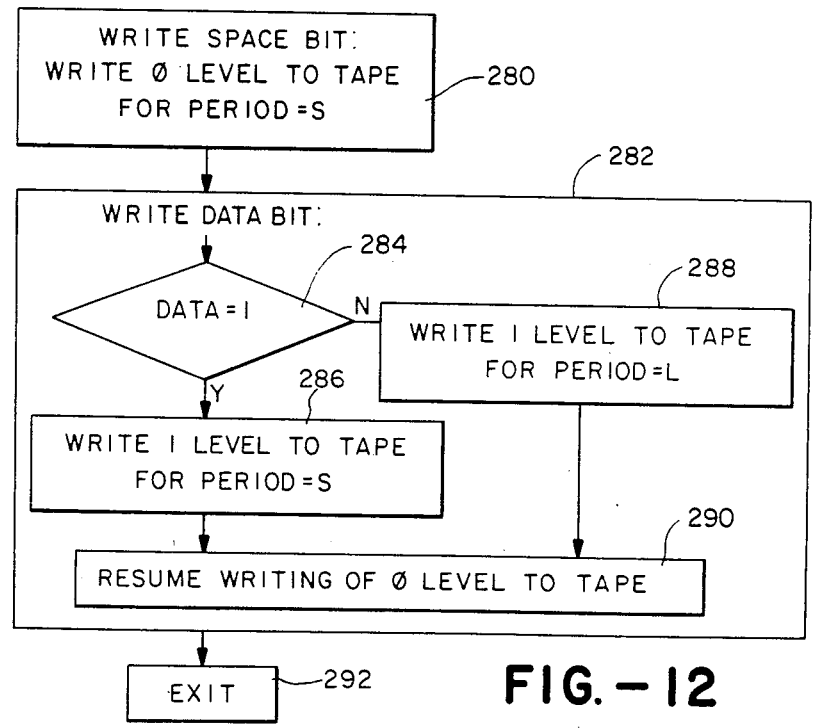
FIG.—12

SOFTWARE TRAINING SYSTEM

This is a continuation of Ser. No. 690,785, filed Jan. 11, 1985 now U.S. Pat. No. 4,637,797.

The present invention relates generally to a computer training system, and particularly to a system for interactively training students to use selected computer. programs.

BACKGROUND OF THE INVENTION

The prior art includes a variety of types of manuals and a variety of special types of special computer programs designed to introduce the student to certain features of a selected computer program. Manual or text based systems are totally unsatisfactory because a large portion of potential users have neither the patience nor discipline to learn how to use a computer program by reading a manual.

Computer based interactive software training systems are generally preferable to text based systems because they require less discipline and patience on the part of the student. Naturally, such systems still generally need to be complemented with a reference manual for use after the initial training is complete. The present invention is a new computer based software training system.

One of the major shortcomings of most prior art computer based software training systems is that the development of courseware (i.e., tutorials) for each new application is very expensive, and thus the cost to the consumer is so high that only a small fraction of the potential market for such systems can afford them.

Another major shortcoming of most prior art computer based software training systems has been their failure to provide oral instructions in conjunction with visual instructions. Oral instruction substantially reduces the amount effort required by the student to learn how to use a new software package.

A related shortcoming of many prior art computer based software training systems is their inability to simultaneously give oral instruction while simulating the entry of commands or data from the keyboard. The provision of such a capability enhances the quality of the tutorials that can be provided by a software training system.

Yet another shortcoming of many prior art computer based software training systems is that they simulate the use of the target software program rather than giving the user actual experience using the program. Such prior art software training system are also expensive to develop because they require the writing of a separate training program for each target software program, must duplicate many of the features of the target computer program, and must be debugged just as carefully and thoroughly as any computer program.

It is therefore a primary object of the present invention to provide an improved computer based software training system.

Another object of the present invention is to provide a software training system which can simultaneously give oral instruction while simulating the entry of commands or data from the keyboard.

Yet another object of the present invention is to provide a software training system which facilitates the economical development of courseware.

Still another object of the present invention is to provide a software training system which gives the user actual experience using the target software program.

SUMMARY OF THE INVENTION

In summary, the present invention is a computer based software training system. It includes a computer, a cassette tape player system, and software for running the computer. This software includes the target program which the student is learning to use and courseware which defines a multiplicity of events which correspond to different portions of a predefined training lesson.

The tape player system is attached by an interface to one of the computer's ports. The interface allows the computer to turn the tape player unit on and off, and also transmits keystroke data from the left track of a stero cassette which is mounted in the tape player to the computer. Oral instructions or other sounds recorded on the right track of the stereo cassette are played over a speaker. The training system works by alternately turning on the tape to give the student oral instructions and to get keystroke data from the tape, and then turning off the tape player while the student enters keystrokes, for use in the target software program, which follow the oral instructions previously given.

The keystrokes entered by the student are compared on a keystroke by keystroke basis with a filter specified by the currently active event in the courseware. If a correct entry is made, the tape player is turned back on and the lesson continues. Certain predefined keystrokes from the tape player cause a new event from the courseware to be selected and for the tape player to be turned off. Furthermore, if the student fails to make the correct keystrokes within a preselected time period the training system enters the correct answer for him and proceeds with the next portion of the training session.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of a computer based software training system in accordance with the invention.

FIG. 2 depicts the data stored on a cassette tape which represents one keystroke.

FIG. 3 is a block diagram of an interface between a cassette transport unit and a computer.

FIGS. 5A and 5B depict a flowchart of the process for handling keystroke data received during a training session.

FIG. 6 is a flowchart of the process for reading keystroke data stored on a cassette tape.

FIG. 7 is a flowchart of the process for reading one bit of keystroke data on a cassette tape.

FIG. 11 is a flowchart of the process for recording a keystroke on a cassette tape.

FIG. 12 is a flowchart of the process for recording one bit of data on a cassette tape.

DESCRIPTION OF THE PREFERRED EMBODIMENT

Figure 4:
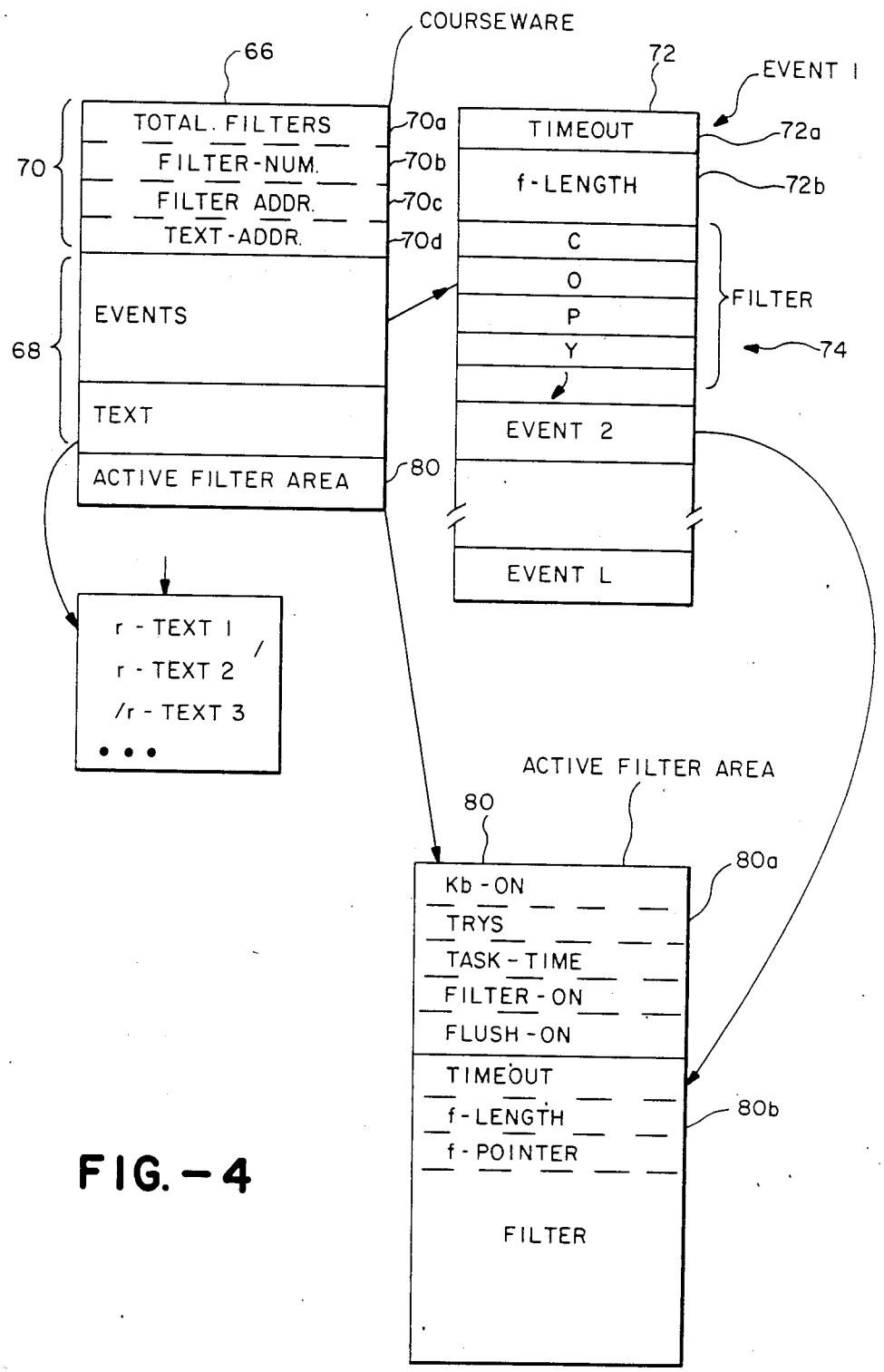
FIG. 4 is a diagram of the courseware data structure used in the preferred embodiment of the invention.

Referring to FIG. 1, there is shown a software training system 20 including a data processing system 21, a cassette tape player system 22, and software 24 for running the data processing system 21. In the preferred embodiment, the data processing system is an IBM PC 26 with a standard keyboard 28 and cathode ray tube display 30.

The tape player system 22 resembles a modified personal stereo (e.g., a Sony Walkman) which is attached by a cable 34 to the printer port 32 of the IBM PC 26. An interface 36 allows the CPU 26 (i.e., the IBM computer) to turn the tape player unit 38 on and off, and also transmits keystroke data from the left track of a stereo cassette which is mounted in the tape player 38. The oral instructions or other sounds recorded on the right track of the stereo cassette are played over a speaker 40, such as a set of head phones or a conventional speaker. The tape player 38 is a standard cassette transport which is adapted for use in the invention by means of the connections to the interface 36, which are explained below.

The software 24 includes the computer's normal operating system 42, the target software program 44 which the student is learning to use, a tutorial control program 46 which controls the process of the invention, and sometimes an auxiliary program 48 which can provide additional training features not provided by the tutorial control system 46.

From the perspective of a user of the system 21, the tape player system 22 gives the user oral instructions on the use of a particular software program 44 which the user is learning how to use. At the same time, the software program 44 is actually in operation in the computer system 20.

After each set of oral instructions the tape unit 38 stops and waits for the user to type in the command or other response which the target software program is waiting for. If the correct answer is given by the user, the tape unit 38 turns back on and the lesson progresses to the next set of oral instructions. If an incorrect answer is given, then a brief error message appears temporarily on the computer's display 30. If an incorrect answer is given several times a remedial message temporarily appears on the display 30.

After the error or remedial message is displayed, the user is given another chance to enter the response needed by the software program 44. If the correct answer is not given within a certain preselected period of time, the training system enters the correct answer for the student and then the lesson progresses to the next set of oral instructions.

Another aspect of the invention as experienced by the user is that at the same time that oral instructions are spoken, the training system can simulate the entry of keystrokes from the keyboard 28. The simulated entry of keystrokes is accomplished by playing back a prerecorded series of keystrokes stored on the left track of the cassette tape. In other words, these keystrokes are actually coming from the tape unit 38, but appear on the display and are used by the software program 44 as though they came from the keyboard 28. It should be noted that the keystroke data recorded on the cassette tape are the scan codes which are produced by the computer's keyboard when its keys are pressed. Therefore the input keystroke data from the tape unit looks exactly the same to the computer as keystroke data from the keyboard.

Another type of visual aid provided by the invention is that while oral instructions are spoken, the training system can temporarily replace a portion of the display with an image of a keyboard in which selected keys are highlighted. This feature is very useful for explaining the location and use of keys such as the ALT, CTRL, and F1 to F10 keys which are commonly found on computer keyboards.

The simultaneous provision of oral and visual instructions is highly advantageous in the design of effective software training lessons.

The system for recording training lessons on cassette tapes is only slightly different from the one for use by students as a software training system, as will be explained in more detail below. The block diagram in FIG. 1 is also applicable to this recording system.

Referring to FIG. 2, an important aspect of the present invention is the manner in which training lessons are recorded on a cassette tape. Keystroke data is recorded on the left track of the tape and oral instructions are recorded on the right track. As will now be explained, the keystroke data is recorded in a manner which is designed to allow up to 33 keystrokes to be recorded per second of tape playing time, and yet to be immune to changes in tape speed of up to 25 percent from the normal tape speed.

Also, as noted above, the keystroke data which is recorded on the cassette tape are the scan codes which are produced by the computer's keyboard when its keys are pressed. Therefore the input keystroke data from the tape unit looks exactly the same to the computer as keystroke data from the keyboard.

FIG. 2 shows a waveform which represents the data stored on the tape for one keystroke. The waveform is a binary waveform which is frequency shifted keyed. In other words, the low level is recorded as a signal of a first frequency and the high level is recorded as a second frequency.

Each keystroke is encoded as a set of 11 bits: two start bits, 8 data bits which are the scan code of the keystroke, and one stop bit. The bits are encoded using a standard PCM encoding scheme: 0 bits are encoded using a waveform of one length and 1 bits are encoded using a waveform of another length. Each encoded bit is preceded by a space bit—which is a waveform having the lower level frequency for a period of approximately 1 millisecond. The length of the waveform having the higher level frequency determines whether the bit is a 1 or a 0 bit. In the preferred embodiment, 0 bits are encoded as a 2 millisecond waveform, which is twice the length of the waveform for 1 bits (which are approximately 1 millisecond long). Furthermore, the start and stop bits are encoded as 1 bits.

Thus the length of each recorded keystroke depends on the number of 1 and 0 bits in the keystroke data. The length of the longest recorded keystroke (representing the byte 00hex) is 30 milliseconds. For reasons which will be explained in conjunction with the discussion of the keystroke recording system, keystrokes are stored on tape at 33 millisecond intervals.

Referring to FIG. 3, the interface 36 between the computer system 21 and the tape player 38 works as follows. In the preferred embodiment, the interface 36 is connected to a printer port 32 on the computer 21. Thus eight parallel data lines D0 to D7 from the computer's data bus are available, as well as a number of other control signals. As will be understood by those skilled in the art of designing such interfaces, the interface 36 could be connected to a serial port on the computer instead of a parallel printer by making two minor changes to the system: using a serial port cable instead of a printer port cable, and using input/output instructions in the training control program to access the serial port instead of the printer port.

The sending and receiving of signals to and from the interface by the computer 21 is accomplished by reading and writing data and control signals to and from the printer port control 32. More specifically, data on the data bus can be written to the printer port 32, where it is latched by the printer port hardware and is sent to the interface 36. Only data line D0 is used to send data to the interface 36 in the preferred embodiment. The data sent on the D0 line is a control signal for turning the tape player on or off. The D0 tape on/off signal is fed into the on/off port of a power regulator 54 which provides the tape player with power.

The tape player 38 is a playback-only stereo cassette tape unit. Thus whenever the tape player 38 is on and a cassette tape is mounted in the tape player, the tape player 38 produces left and right track signals. The right track signal, which is an audio signal which contains the oral instructions for a training lesson, is fed onto a line called AudioOut which is to be connected to a speaker or set of headphones 40.

The left track signal, which contains encoded keystroke data, is fed through a bypass filter 58 into a standard Frequency Shift Keying (FSK) demodulator 60. The FSK demodulator produces a binary 0 signal on the data line when the input signal is at or close to a first preselected frequency and produces a binary 1 signal when the input signal is at or close to a second preselected frequency. The particular frequency values used are not important, but in the preferred embodiment Bell Systems Standard 103 communication frequencies have been used for convenience.

The FSK demodulator 60 also produces a data OK signal whenever the left track signal is at or close to either of the two preselected frequencies which represent a binary 0 or 1. When the data OK signal is inactive it means that either no signal is being received or that something other than keystroke data is being received.

The data and data OK signals are received by the printer port 32 through buffers 62 and 64. The buffered data OK signal is sent over an input printer port control signal line called +Select and can also optionally be used to turn on an LED which indicates that good keystroke data is being received from the tape player 38. The buffer data signal is sent over both an input printer port control signal line called −Error and also an interrupt line PrtAck. The signal values on the +Select and −Error lines are received by the computer 21 when it reads the status of the printer port. As will be explained in more detail below, the connection of the data signal to the hardware interrupt line PrtAck is used to generate an interrupt signal at the end of the first start bit in each keystroke received from the tape player 38.

Thus in summary, the interface 36 is a device controlled by the computer 21 for the purpose of turning the tape player 38 on and off, and also for the purpose of receiving decoded keystroke data from the tape player.

Referring to FIG. 4, there is shown the data structure of the courseware 66, which is the main software data structure used in the preferred embodiment. The purpose of the coureware is to define a set of events 68, each of which corresponds to a particular juncture in a training lesson.

The courseware 66 acts a complement to the oral instructions and keystroke data which is recorded on tape. When the tape recorder is playing, the keyboard 28 is disabled and courseware 66 is inactive. On the other hand, when tape recorder is stopped, the keyboard and courseware are enabled. As will be seen, each event in the courseware is used to ensure that the corresponding cassette tape portion of the training lesson is understood by the student.

The courseware data structure 66 includes a header 70 which stores four parameters: the total number of events or filters 70a which are stored in the courseware 66; the sequence number 70b of the event or filter currently being used; the address 70c of the beginning of the filter being currently used; and the address 70d of the text portion of the event currently being used. The initial values of these parameters 70a to 70d are set when the tutorial control program is loaded into the computer's memory.

Each event data structure 72 includes a filter, which represents the correct answer which the student is supposed to enter at the computer's keyboard 28 at a particular point in the training session; and a remedial message 76 for display to the student if he fails to enter the correct answer. In the preferred embodiment the text of the remedial messages is contained in a separate TEXT array 78 from the filter portion of the event data structures. The filter portion of the event data structure also contains two parameters: a timeout parameter 72a corresponding to the length of time which the student is to be given to enter the correct answer; and the number of keystrokes 72b in the filter.

The remedial messages for all the events are stored sequentially in a TEXT array 78. Each remedial message 76 ends with a "/" character to mark its end and the beginning of the next message.

The last data structure in the courseware 66 is called the active filter area 80. The first half 80a of the active filter area holds five parameters: Kb-On, which indicates whether the keyboard is currently enabled or disabled; Trys, which keeps track of the number of errors the student has made since the current event was installed; Task-time, which is the amount of time which has elapsed since the current event was installed; Filter-on, which indicates whether any event or filter is currently installed; Flush-on, which indicates whether a special process called flushing the filter into the keyboard buffer is currently active.

The second half 80b of the active filter area is a copy of the currently installed event, plus f-pointer, which points to the character in the filter currently in the active filter area which is then next keystroke that the student is supposed to type in.

Referring to FIGS. 5A and 5B, there is shown a flowchart of the process which receives keystroke data from the tape player 38. This Tape Data Ready process is initiated by a hardware interrupt which is generated by the first start bit of each keystroke. That is, the up transition on the PrtAck. line which occurs when the tape player plays the first start bit of a keystroke causes the computer to perform a hardware interrupt, which initiates the running of the process shown in FIGS. 5A and 5B.

The first steps of the Tape Data Ready interrupt process are to save the computers registers (as is always done in such routines) (see box 90) and to call the Read Tape routine (box 92), which will be discussed below with reference to Figure 6. The result of the Read Tape routine is that one keystroke is stored in the variable called Input, and a flag indicates whether the Read Tape routine successfully read a keystroke. An unsuccessful read can be caused, for instance, by a glitch on the PrtAck line which erroneously triggers the Tape Data Ready interrup process.

If the Read Tape process was not successful (box 94), the process exits via entry point A to the routine's common exit, which merely restores the computer's registers (box 96) and exits (box 98).

If the Read Tape process was successful, there are four special conditions which must be checked. If none of these special conditions apply, the keystroke is sent to the normal keyboard service routine and is treated as though the keystroke came from the computer's keyboard 28.

If the Input keystroke is the "5" key on the keyboard's numeric keypad (box 100) the following "visual keyboard" subroutine is performed. The visual keyboard subroutine is a routine for temporarily replacing the top half of the computer's display with an image of a keyboard with selected keys highlighted. This feature is very useful for explaining the location and use of keys such as the ALT, CTRL, and F1 to F10 which are commonly found on computer keyboards.

The first step of the visual keyboard subroutine is to switch the state of a flag called V.ON (box 102). If V.ON is then equal to 1 (box 104) the visual keyboard is turned on by saving a copy of the portion of the screen which is to be replaced by the visual keyboard (box 106) and then copying the visual keyboard image into the computer's video memory (box 108). If V.ON is equal to 0 (box 104) then the computer's video memory is restored to the state it was in before the visual keyboard was turned on (box 110). After the visual keyboard subroutine is done the process exits via entry point A to the routin's common exit.

Next, the routine checks (box 112) to see if the Input keystroke is equal to "Alt ?", which means that the question mark key was pressed while the Alt key was being held down. If so, the next filter in the courseware is loaded into the active filter area 80 (box 114), the tape player is stopped (box 116) and the keyboard is enabled (box 118).

When a new filter is to be loaded into the active filter area 80 (box 114) the filter-num parameter 70b is first checked to see if equals the total filters parameter 70a. If so, the end of the training session has been reached and there are no more events to load into the active filter area. Therefore the filter-on parameter (in the active filter area 80a) is left off to indicate that the filter is off. Otherwise, the next filter in the courseware is copied into the active filter area 80b, filter-num parameter 70b is incremented, the Trys and Task-time parameters in area 80a are reset to zero, the Flush-on parameter is reset to ensure that flushing is disabled, and the f-pointer parameter in area 80b is set to point to the first character in the filter which was just copied into the active filter area. Furthermore, when a new filter is loaded into the active filter area the text-addr pointer parameter 70d is advanced to point to the first character of the remedial message corresponding to the new filter by advancing the text-addr pointer just past the "/" character which marks the end of the previous remedial message.

After a new filter has been loaded (or even if an event has not been loaded because the end of the courseware has been reached) the tape is stopped (box 116). This is accomplished by addressing the interface 36 and "writing" a zero bit on data line D3, which turns off power regulator 54 in the interface 36.

The keyboard is enabled (118) merely by setting the kb-on parameter in filter area 80a to a value (e.g., of 1) which enables the operation of the keyboard interrupt routine, which is discussed below with reference to FIG. 9.

Next, referring now to FIG. 5B, the Tape Data Ready routine checks (box 120) to see if the Input keystroke is equal to "Alt W", which means that the "W" key was pressed while the Alt key was being held down. If so, a preselected coprocess is activated (box 124) if the coprocess is not already on (box 122).

The coprocess can be any preselected software program. Typically through, the coprocess will be a software program which is used to design more complex training sequences than is possible using just the courseware and training control program described herein. For instance, a coprocess could be used to provide "help" screens at certain junctures and could be used to analyze the student's progress and to change the lesson sequence if necessary. For example, the coprocess could under certain conditions load in a new set of courseware from a disk file and could advance the cassette tape in the tape player to the beginning of the training session corresponding to the newly loaded courseware.

Finally, the Tape Data Ready routine checks (box 126) to see if the V.ON parameter indicates that the visual keyboard feature, discussed above, is currently on. If not, the Input keystroke is sent to the normal keyboard service routine (box 129), which treats the Input keystroke as though it came from the computer's keyboard 28. Thus the Input keystroke is used as keyboard input to the computer 21—which shows up on the screen and so on. This facility allows the training program to perform steps which the author of the training program does not want the student to have to perform—such as a long sequence of preparatory steps which might make the student loose interest before the student learns more about the target software program.

If the V.ON parameter indicates that the visual keyboard feature is currently on, the Input keystroke is highlighted on the visual keyboard (128) and is not used as input to the applications program which the student is learning to use. More specifically, if the Input keystroke is a "make" keystroke (i.e., a downstroke on the input key), the key is highlighted; and if the Input keystroke is a "break" keystroke (i.e., a release of the input key) the key's highlighting is turned off.

Referring to FIG. 6, the Read Tape routine, which is called by the Tape Data Ready routine discussed above with reference to FIGS. 5A and 5B, works as follows. The interrupt status is saved (box 130) and then the time, keyboard and tape player interrupts are disabled (box 132). One reason that it is necessary to disable these interrupts because the successful reading of the keystroke data from the tape player is dependent on the measurement of time by counting the number of CPU cycles executed while reading each bit of the keystroke data.

Next the Read Bit routine is called (box 134) to read the second start bit, which is a 1 bit. If the start bit is not read successfully (e.g., a 0 bit is read) (box 136) then an error code is incremented so that the Tape Data Ready routine will know that this was not a successful read operation.

Then the routine reads in the next 8 bits and accumulates them in the Input variable. After the stop bit has been read (box 142) by calling the Read Bit routine again, the interrupt status is restored and the disabled interrupts are re-enabled (box 144) and the routine exits (146). The net result of the Read Tape routine is that one keystroke from the tape player is captured in the Input variable.

Referring to FIG. 7, the Read Bit routine is the routine which actually scans the data signal generated by the interface 36 from the tape player signal and then determines if the data being received represents a 1 bit or a 0 bit. The Read Bit routine is generally called first when the tape player is in the middle of the first start bit, and then while the tape player is in the space bit before each of the other bits in each keystroke.

The first step (box 148) of the Read Bit routine is to make sure, and to wait if necessary until, the tape player is playing a space bit (box 148). This is done by waiting until a low tape data signal is read twice—twice to prevent a glitch from giving an erroneous reading. Second, the routine locates the beginning of the next bit by waiting until a high tape data signal is read twice (box 150). Then the routine waits until a low tape data signal is read (box 152), and counts the length of time this takes. If (see box 154) the elapsed time is less than X (which is equal to 1.5 milliseconds in the prefered embodiment) the bit read is considered to be a 1 bit (box 156), otherwise it considered to be a 0 bit. Then the routine exists (box 160).

Figure 8:
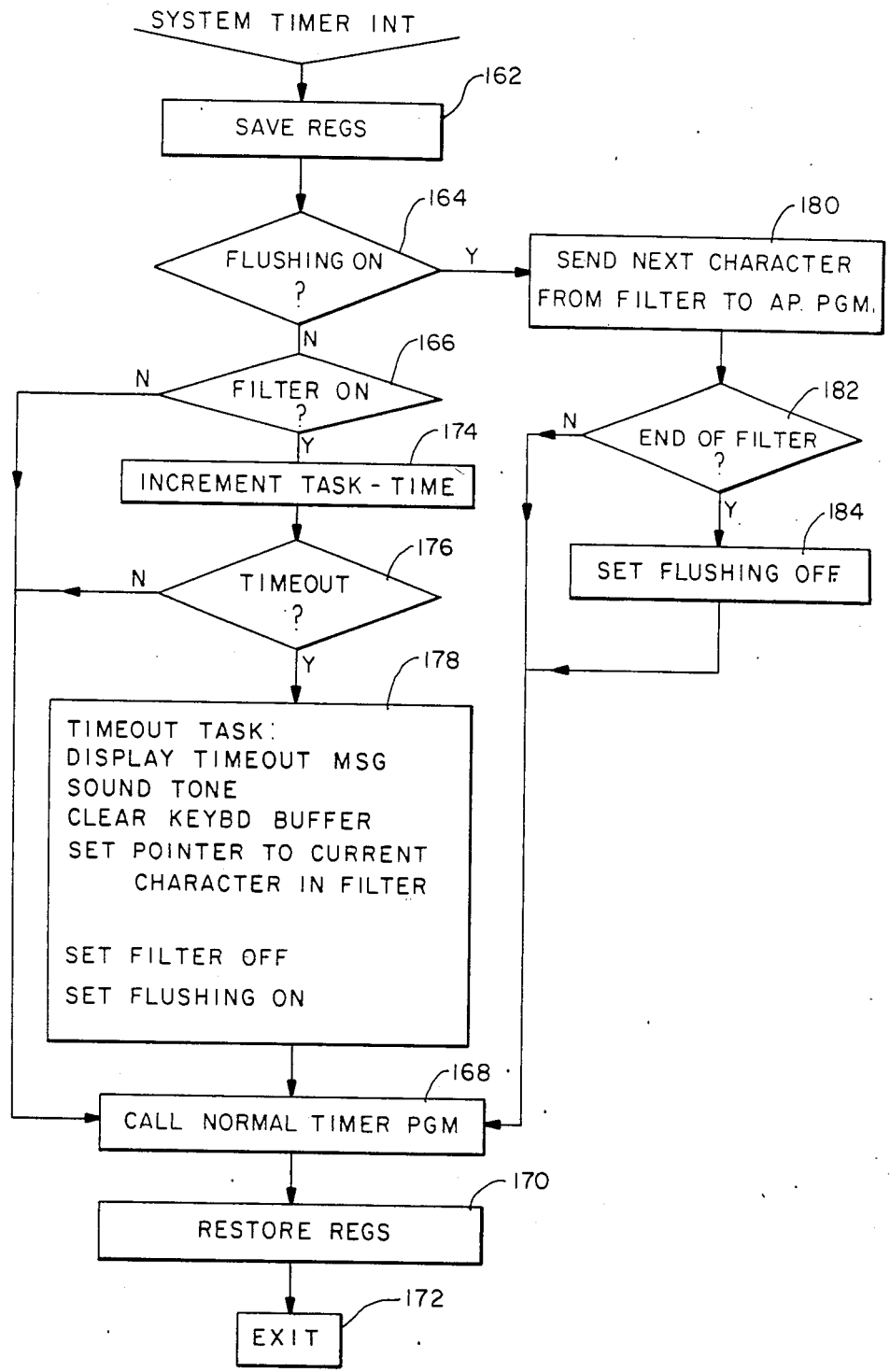
FIG. 8 is a flowchart of a periodic system timer interrupt process for keeping track of the passage of time and for providing the keystroke data representing a correct answer to the student during a training session if the student fails to enter a correct answer within a preselected time period.

Referring to FIG. 8, there is shown a flowchart of the System Timer Interrupt process which is automatically periodically activated by the computer's hardware (every 18.2 milliseconds in the IBM PC). This routine supplements the normal timer program which is called just before this routine exits. In summary, the main function of the System Timer Interrupt process is to determine when the student has run out of time to type in an answer, and upon the occurrence of a timeout to copy the current filter to the keyboard buffer where it will be used by the target software program. After a timeout has occurred, one character is transferred from the filter to the keyboard buffer each 18.2 milliseconds, thereby simulating the action of a fast typist.

The System Timer Interrupt routine saves the computer's registers (box 162) and then determines if flushing is currently enabled (box 164) by testing the Flush-on parameter in the active filter area.

If flushing is not on, the routine checks Filter-on to see if any event is currently active. If not, the routine exists through the common exit by calling the normal timer program used for handling timer interrupts (box 168), restoring the computer's registers (box 170) and existing (box 172). Normally, an event is active (and Filter-on is on) whenever the tape player is off and the system is waiting for the student to type in a command or answer.

If flushing is off and an event is currently active, the task-time parameter is incremented (box 174) to note the passage of time and then the system checks for timeout (box 176) by testing to see if task-time is greater than or equal to the timeout parameter. If timeout has not occurred the routine exits though the common exit (boxes 168, 170 and 172) which includes calling the normal timer program (box 168).

If timeout has occurred the following tasks are performed (box 178): Filter-on is set off; a timeout message is temporarily displayed (e.g., "Sorry, your time is up ! Watch this . . .") and then the original display is restored; a tone is generated while the timeout message is displayed to get the student's attention; the keyboard buffer is cleared; the f-pointer parameter is used to point to the current character in the filter; and the Flush-on parameter is set on. Then the routine exits through the common exit (boxes 168, 170, 172).

If Flushing is on (box 164), then the routine sends the next character in the filter to the keyboard buffer for use by the target software program (box 180). That is, the character currently pointed to by the f-pointer parameter is sent to the keyboard buffer and then f-pointer is incremented. If the transmitted character is the last character in the filter (box 182) the Flush-on parameter is turned off. Thus one character is flushed from the filter each 18.2 milliseconds (i.e., once each system clock cycle). Then the routine exits through the common exit (boxes 168, 170, 172).

Also, while it is not shown in the flowchart, it should be noted that in the preferred embodiment, the task-time parameter is not incremented when error and remedial messages are displayed (see discussion below regarding the Keyboard Interrupt process)—thereby preserving the student's full preselected period for typing in the correct answer.

Figure 9:
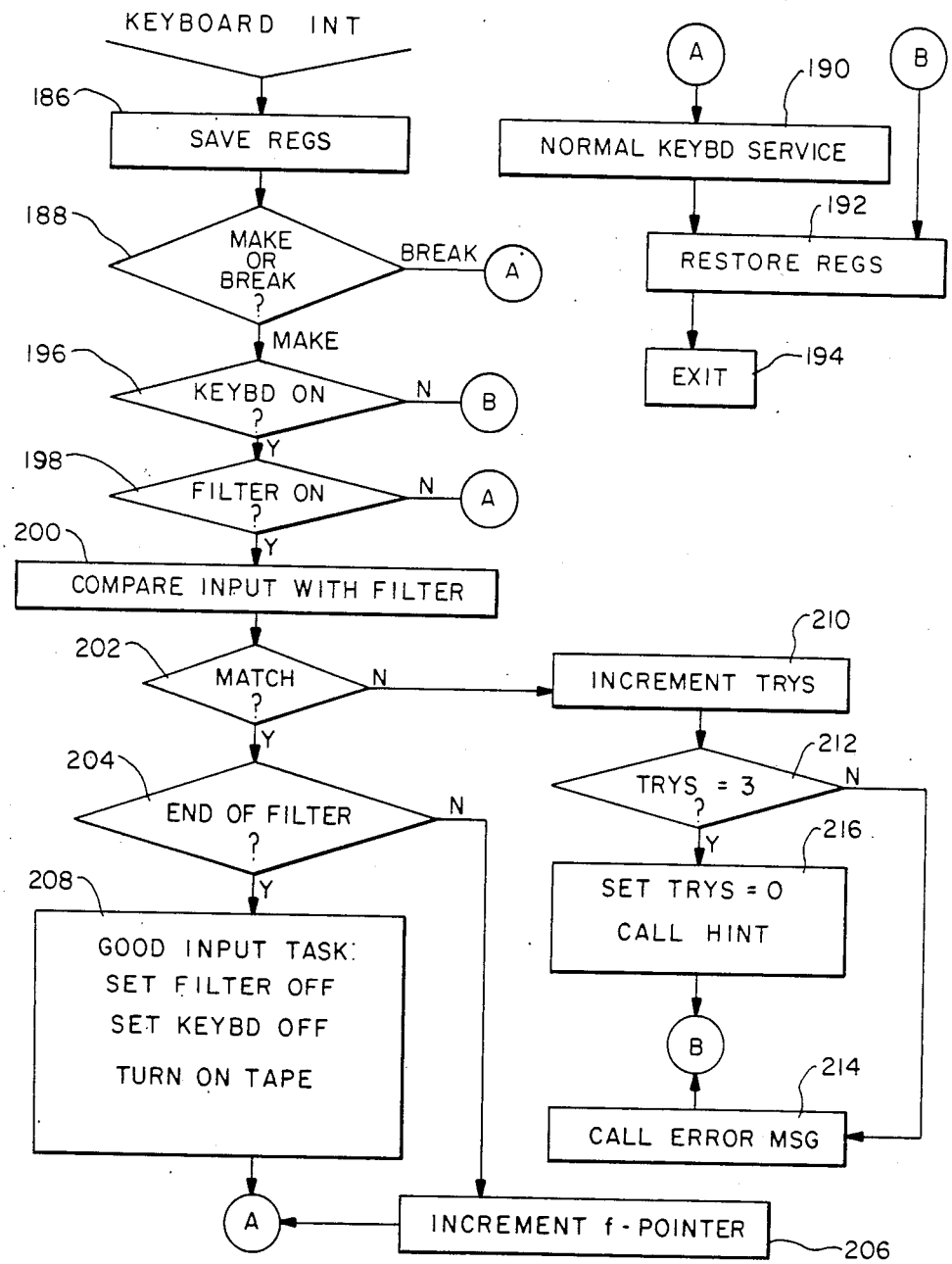
FIG. 9 is flowchart of the process for handling keyboard input during a training session.

Referring to FIG. 9, there is shown a flowchart of the Keyboard Interrupt process which is activated whenever a key is pressed or released on the computer's keyboard 28. The primary purpose of this routine is to compare keyboard entries by the student with the current active filter. If a match occurs, the student's entry is passed on to the normal keyboard service routine, otherwise an error message is generated and the student's entry is thrown away.

The routine begins by saving the computer's registers (box 186) and testing to see if the student's keystroke is a "make" (i.e., downstroke) or "break" (i.e., release) keystroke. If its a break keystroke, then the routine exits through common exit A (boxes 190, 192 and 194), calling the normal keyboard service routine, restoring the computer's registers and exiting. This is done because break keystrokes are not passed to the target software program and therefore don't need special handling.

Next, the routine checks to see if the keyboard is enabled (i.e., if Kb-on is turned on) (box 196). If not, the routine exits through common exit B (boxes 192, and 194) because all keyboard input by the student is ignored when the keyboard is disabled.

Then the routine checks to see if Filter-on is turned on (box 198). Normally, Filter-on is on whenever the keyboard is enabled, except after the last event has been loaded and there are no more events in the courseware to be used. If the filter is off, however, the routine exits through common exit A (boxes 190, 192 and 194)—which allows the keyboard entry to be processed by the normal keyboard service routine.

Given that the keyboard is enabled and Filter-on is turned on, the Input from the keyboard is compared with the character in the filter which is pointed to by the f-pointer parameter (box 200). If the student has made a correct entry the Input will match the filter (box 202). If the character in the filter which has been matched is not the last character in the filter (box 204) then f-pointer is incremented (box 206) to point to the next character in the filter and then the routine exits through common exit A—which allows the keyboard entry to be processed by the normal keyboard service routine.

If the character which has been matched is the last character in the filter (box 204) then the following tasks are performed to terminate the current event (box 208): Filter-on is turned off; the keyboard is disabled; and the tape player is turned on. Then the last entry by the student (which matched the last character in the filter) is sent to the target software program by exiting from the routine through common exit A (boxes 190, 192 and 194).

If the Input character does not match with the filter (box 202) then the following error handling process is invoked. First the Trys parameter is incremented (box 210). Then if Trys is less than three (box 212) an error message (e.g., "oops! that's not correct. Try again.") is briefly displayed on the screen (box 214). If, however Trys equals three then a remedial message is temporarily displayed on the computer's screen and Trys is reset to zero (box 216). The remedial message displayed is the one defined by the currently active event (and pointed to by the text-addr parameter 70(d). This message is preceded by a title "Hints and Help Section" line, and is padded at the end with a line that states "Press any key to continue". The program then waits until any keystroke is entered by the student before continuing.

The display of remedial and other messages on the screen is performed using the same process as for the display of the visual keyboard: a copy is made of the portion of the screen which is to be overwritten; the message is copied into the computer's video memory; the computer generates a tone to get the student's attention and then waits a while (e.g., several seconds) before restoring the screen to its previous state.

Recapping the foregoing description, there has been shown the hardware and basic processes for implementing a preferred embodiment of the invention. The hardware includes a tape player and an interface which allows a computer to turn the player on and off, and also to receive keystroke data which has been recorded on one of the two tracks of a stereo cassette tape.

The software routines required include a hardware interrupt routine for receiving keystroke data from the tape player 38 and for handling certain special functions which are initiated by the receipt of certain preselected keystrokes from the tape player. In particular, one preselected keystroke from the tape player causes a new event to be selected from the set of events in the training system's courseware. The training system also includes a keyboard interrupt routine for comparing the student's keystrokes with a preselected "correct" sequence which the student has been instructed to type in; and a system timer interrupt routine for limiting the amount of time the student has to try to enter a correct answer and for flushing the preselected correct keystroke sequence into the keyboard buffer after a timeout has occurred.

One further process needed to implement the invention is the process for initially loading the training system into the computer 21 and for starting a training session. Generally, the loading of the training control software is the same as the loading of any program which is designed to replace some of the system's normal interrupt routines. Thus as will be understood by those skilled in the art, the training system's initial tasks when first loaded is to replace the vectors for the interrupt routines which are being replaced so that the interrupt vectors point to the proper routines in the training control software. Then the training control initialization routine exits, leaving the training control software resident in the computer's memory.

A training session is started by: (1) loading in a courseware file into the courseware arrays in the training program (which can be accomplished either by having the student type in a command such as "LESSON lesson-name", where lesson-name is the name of the file with the proper courseware, or by having this command entered using keystroke data from the tape player); and (2) loading the lesson tape in the tape player and turning the tape unit on.

The courseware file is built by having the author of the lesson write a file which look like TABLE 1, using a standard word processing program such as WORDSTAR. Then, as will be understood by those skilled in the art, this file is easily converted into a file with the courseware data structure shown in FIG. 3. Referring briefly to TABLE 1, the EVENT and END EVENT lines mark the beginning and end of each event; the TIME parameter corresponds to the number of seconds the student is to be given to enter a correct answer; the MATCH parameter contains the hexadecimal values of the keystrokes which are to be used as the filter for the event; and event's remedial message begins on the line after the HINT line and ends with the "/" character.

Referring to FIGS. 10-13, the hardware and software used to record training sessions on a cassette are somewhat different than for the training system used by students. The authoring and training systems, however, are more similar than different and therefore only the difference are discussed in the following description of the authoring system.

Referring back to FIG. 1, the hardware for the authoring system follows the same block diagram as for the training system, except that the authoring system interface is connected directly to the computer 21 rather than to one of the computer's ports. The main other differences are in the design of the interface, and the use of a tape recording unit instead of a tape player unit.

Also, the software for the authorizing system is the basically the same as for the training system, the exceptions being (1) the Keyboard Interrupt routine in the authoring system plays the role of the Tape Data Ready routine in the training system; and (2) the Read Tape and Read Bit routines in the training system are replaced with Send Byte and Write Bit routines in the authoring system.

Figure 10:
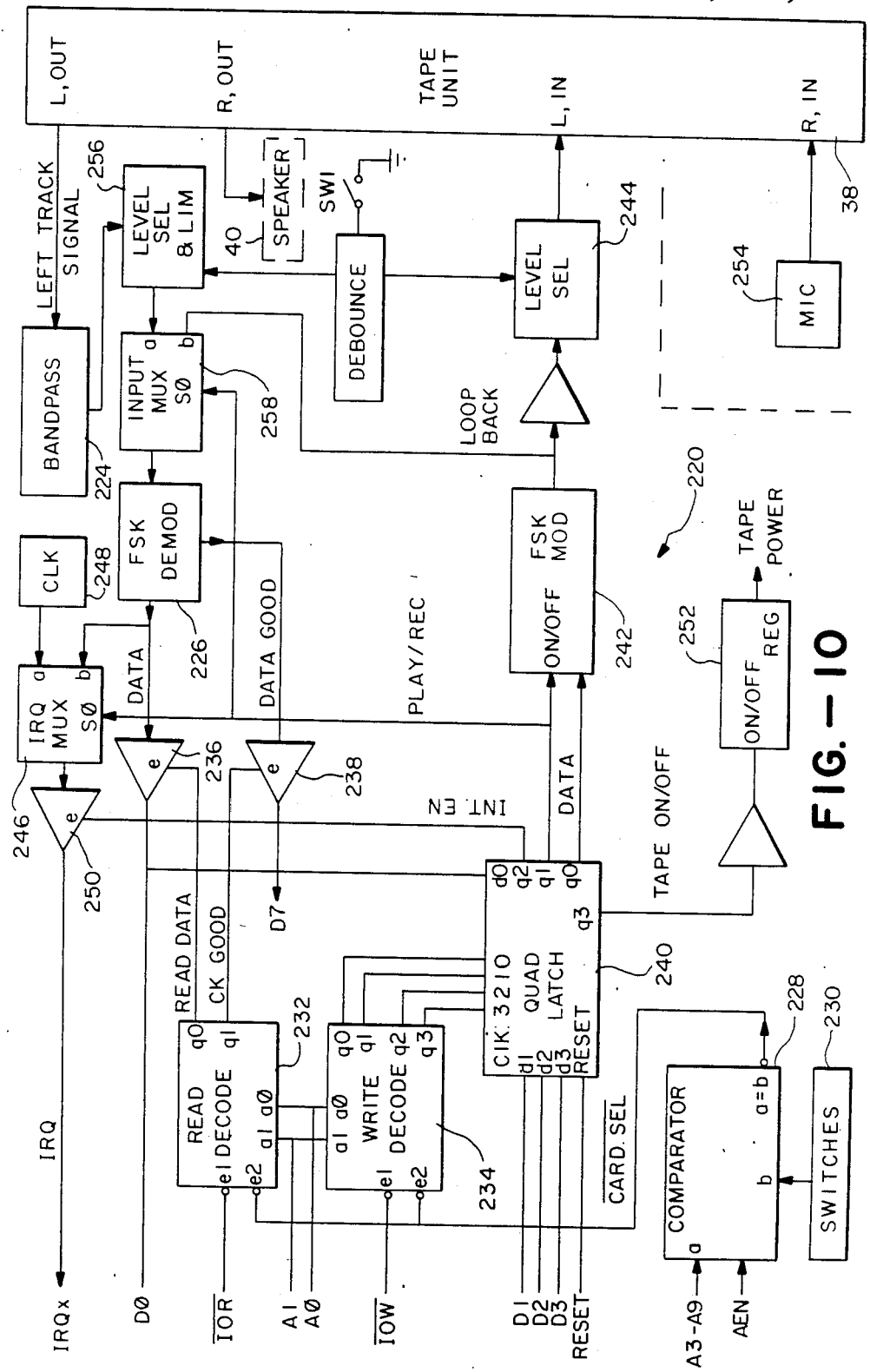
FIG. 10 is a block diagram of an interface between a cassette transport unit and a computer for use during the recording of a training session on a cassette tape.

Referring now to FIG. 10, the authoring system's interface 220 is connected to the computer as an add on board rather than through the computer's printer port.

The interface 220 is selected and comparator 228 issues a $\overline{\text{CARD.SEL}}$ signal whenever the value of the A3-A9 and AEN address signals match a set of binary signals provided by switches 230. The use of switches 230 allows the address of the interface 220 to be reset, if necessary, to avoid an addressing conflict with other portions of the computer system 21. The $\overline{\text{CARD.SEL}}$ signal enables the Read Decode and Write Decode 234 circuits, which control the operation of the interface 220.

Note that signals which are active when low are denoted by an overscore (e.g., $\overline{IOR}$).

The Read Decode circuit 232 is responsive to address signals A0 and A1 when the $\overline{IOR}$ signal is active. When $\overline{IOR}$ is active and A1,A0=0,0, the Read Data signal becomes active and enables buffer 236. Buffer 236 then transmits data onto the computer's data bus line D0. This data is keystroke data either from the tape unit (not shown) or which is currently being transmitted to the tape unit.

When $\overline{IOR}$ is active and A1,A0=0,1, the Ck Good signal become active and enables buffer 238. Buffer 238 then transmits data onto the computer's data bus line D7. This data is a signal which confirm that good data is being received from the tape unit.

The Write Decode circuit 234 is responsive to address signals A0 and A1 when the $\overline{IOW}$ signal is active. When $\overline{IOW}$ is active one of four latches (i.e., D flip-flops) in quad latch 240 is strobed in accordance with the value of A0 and A1. Note that the terms "latch" and "flip-flop" are used interchangeably in this discussion.

When $\overline{IOW}$ is active and A1,A0=0,0, then the data on data line D0 is strobed into the latch in quad latch 240 which generates output q0—labelled "data". This "data" is encoded by Frequency Shift Keying (FSK) modulator 242, and the encoded data is then recorded by the tape unit. A level select circuit 244 is used to match the input impedance of the tape unit's line input or microphone input port.

When $\overline{IOW}$ is active and A1,A0=0,1, then the data on data line D1 is strobed into the latch in quad latch 240 which generates output q1—labelled "Play/Rec". The Play/Rec signal enables the operation of the FSK modulator 242 when it is set to "Rec". It also controls which of two signals is sent by IRQ Mux 246 to the IRQx line. IF Play/Rec is set to "Rec", then the output of Clock 248 is selected; if Play/Rec is set to "Play", then the output of the FSK demodulator 226 is selected.

The Clock 248 is a gated oscillator which generates a square wave clock signal with a period of approximately 33 milliseconds. While the interface is in Record mode, this clock signal generates a Send Byte Interrupt signal to th e computer 21, which causes the Send Byte Interrupt routine to start running. As will be discussed below, if any keystrokes are currently in the computer's keyboard buffer, the Send Byte Interrupt routine sends one keystroke to the interface for recording by the tape unit.

When $\overline{IOW}$ is active and A1,A0=1,0, then the data on data line D2 is strobed into the latch in quad latch 240 which generates output q2—labelled "Int.En". When the Int.En signal is active it enables the operation of buffer 250, which transmits the output of the IRQ multiplexer 246 onto the IROx line.

When $\overline{IOW}$ is active and A1,A0=1,1, then the data on data line D3 is strobed into the latch in quad latch 240 which generates output q3—labelled "Tape On/-Off". When Tape On/Off is active the tape unit is turned on by power regulator 252 and when Tape On/-Off is inactive the tape unit is turned off.

When Play/Rec is set to Rec, the FSK modulator 242 encodes the binary value of the data signal (i.e., the q0 output of the Quad Latch 240). If Tape On/Off is enabled, the output of the FSK modulator 242 is recorded on the left track of the cassette tape which is currently mounted in the tape unit.

The level select circuit 244 is used to match impedances with either the line or the microphone input ports of the tape unit. The impedance level is selected using switch SW1.

It should be noted that keystrokes are recorded on the left track of the cassette tape at the same time that oral instructions and other sounds are recorded on the right track. (Note that the connection of microphone 254 to the right track input line of the tape unit is not part of the interface 220, because the microphone is generally connected directly to the input port of the tape unit.) Thus a lesson can be recorded by having the author enunciate the oral instructions for the lesson while entering keystrokes on the keyboard. Generally the courseware is designed and loaded into the computer before the recording session begins. The target software program is also loaded into the system. Then the author recording system performs all the necessary functions so that as the recording session progresses, the author sees the same progression of screens from the target software program as the student will see when using the training system.

To aid the author and also to facilitate testing of the authoring system, both the keystroke signals being recorded and previously recorded keystrokes can be demodulated and read back into the computer 21.

As in the training system, the tape unit produces separate right and left track output signals. The right track signal is sent to a speaker 40 and the left track signal is sent through a bandpass filter 224. This signal can then be fed through a Frequency Shift Keying (FSK) demodulator 226 to produce binary data which can read by the computer 21.

This FSK demodulator 226 performs the same function as the FSK demodulator 60 in the training system interface. It produces a binary 0 signal on the DATA line when the input signal is at or close to a first preselected frequency and produces a binary 1 signal when the input signal is at or close to a second preselected frequency. It also produces a DATA GOOD signal whenever the left track signal is at or close to either of the two preselected frequencies which represent a binary 0 or 1. When the DATA GOOD signal is inactive it means that either no signal is being received or that something other than keystroke data is being received.

A level selection and level limiter circuit 256 is used to scale the input signal, in accordance with whether the signal is coming from the line out port of the tape unit or from the headphone output port, before it is demodulated by the FSK demodulator 226. It also contains and performs the function of a standard audio input level limiter circuit.

The Play/Rec signal from the Quad Latch 240 is used by the Input Multiplexer 258 to determine whether keystroke output from the tape unit, or the keystroke data currently being recorded by the tape unit should be sent to the FSK demodulator 226. If the output of the FSK modulator 242 is selected by setting Play/Rec to Rec, then the computer can check that valid keystroke data is being recorded by polling the D7 data line (by enabling $\overline{IOR}$ and setting A1,A0=0,1).

Also, when Play/Rec is set to Play, the IRQ multiplexer selects the DATA line signal as the IRQ signal, and therefore the IRQ interrupt signal is generated by the first start bit of each keystroke received from the tape unit instead of by the periodic clock signal generated by Clock 248. Thus the authoring system's interface 220 can be used to perform not only keystroke recording functions but also all the tape reading functions of the training system interface 36.

When the authoring system is being used to record a training session, the Play/Rec signal is set to Rec. Therefore the periodic clock signal generated by Clock 248 causes a periodic interrupt in the computer. In the preferred embodiment, this interrupt occurs once every 33 milliseconds—three milliseconds longer than it takes to record one keystroke. The routine which is activated by this interrupt is called Send Byte Interrupt.

As indicated earlier, the way a training session is recorded on a cassette is that the author types in keystrokes for use in the lesson at the same time that oral instructions are recorded. Of course, in other embodiments using more sophisticated tape units, the oral instructions could be recorded first and then the keystrokes could be recorded on the left track while the right track is played over a speaker—but the end result is the same: the tape, when played, will simultaneously generated oral instructions and keystrokes.

In any case, the keystrokes entered by the author during the recording session are stored in a keyboard buffer until they are picked up by the Send Byte routine and are sent to the tape unit.

Referring to FIG. 11, the Send Byte Interrupt routine begins by saving the computer's registers, setting an In Progress flag, and disabling the generation of additional Send Byte interrupts (box 270). The disabling of the interrupt is necessary to make sure that a glitch on the interrupt line does not cause the Send Byte routine to reenter itself in the middle of its operation—a problem which can could otherwise cause the recording process to fail occasionally.

Next, the routine checks to see if the keyboard buffer is empty (box 272). If so, there are no keystrokes to send to the tape unit and the routine exits through the common exit (box 274) which resets the In Progress flag, re-enables the Send Interrupt, restores the computer's registers, and then exits (box 276).

If one or more characters are in the keyboard buffer one character is picked up and sent to the tape unit (box 278). The steps of this process are: write two start bits, write the 8 bits of the keystroke picked up from the keyboard buffer, write one stop bit, and then wait, 2 milliseconds to make sure that keystrokes are not recorded too close to one another on the tape. Then the routine exits through the common exit (boxes 274 and 276).

Referring to FIG. 12, there is shown the flowchart of the routine for recording one bit on tape. First a space bit, with level 0 (i.e., a low frequency signal), is written for 1 millisecond (box 280). Note that Period S (short) in the flowchart is equal to 1 millisecond and Period L (long) is equal to 2 milliseconds.

Next the data portion of the bit is written (box 282). If the data bit is a 1 bit (box 284) then a level 1 signal (i.e., a high frequency signal) is written for Period S (one millisecond) (box 286); otherwise it is written for Period L (two milliseconds) (box 288).

After the data portion of the bit is written, the output signal to the tape recorder is restored to level 0 (box 290) to begin either another space bit or for use as filler between keystrokes. Then the routine exits (box 292).

Figure 13:
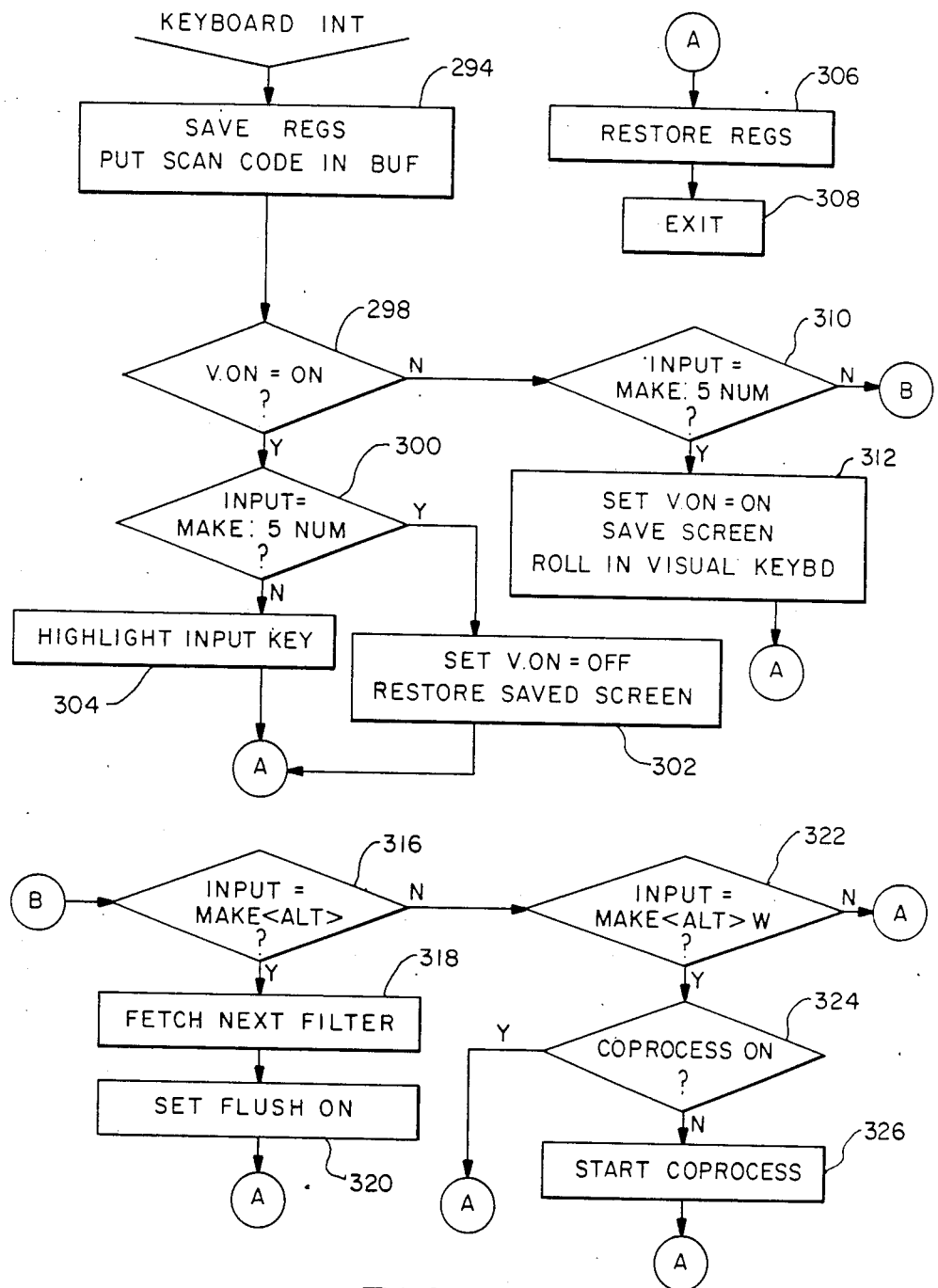
FIG. 13 is a flowchart of the process for handling keyboard input while recording a training lesson on a cassette tape.

Referring to FIG. 13, there is shown the flowchart of the Keyboard Interrupt routine used in the authoring system. This Keyboard Interrupt routine performs two function: it puts the scan code of each keystroke in the keyboard buffer for use by the Send Byte routine, and it simulates the action of the Tape Data Ready routine in the training system so that the author will see the same displays on the computer's display as the student will see when the lesson is used in the training system.

The Keyboard Interrupt routine begins by saving the computer's registers and putting the scan code of the keystroke which caused the interrupt into the keyboard transmission buffer (box 294). Note that the scan code of the keystroke is the raw binary signal produced by the keyboard and is not an ASCII or EBCIDIC character.

Next the V.ON parameter is checked to see if the visual keyboard has been previously enabled (box 298). If so the visual keyboard is turned off and the screen is restored (box 302) if the input keystroke is a downstroke of the 5 key on the numeric keypad (box 300). Otherwise, if the visual keyboard is on, the input image of the key corresponding to the input keystroke is highlighted if the keystroke is a "make" keystroke, and the key's highlighting is turned off if the keystroke is a "break" keystroke (box 304). Thus recording system mimics the action of the visual keyboard feature of the training system, which was discussed above.

If the V.ON parameter indicates that the visual keyboard was not previously enabled, then the visual keyboard is turned on if the input keystroke is a downstroke of the 5 key on the numeric keypad (box 310). As in the training system, turning of the visual keyboard involves setting V.On to On, saving a copy of the portion of the display which is overwritten by the visual keyboard, and coping the visual keyboard into the computer's video memory (box 312).

If the visual keyboard is off, the input keystroke is checked to see if it is a "make" "ALT !" keystroke (i.e., a downstroke on the question mark key while the ALT key is held down) (box 316). If so, the next filter in the courseware is loaded into the active filter area (box 318) (which includes the process of advancing the text-addr parameter to the beginning of the remedial message text corresponding to the newly loaded filter) and the Flush-on parameter is set on (box 320).

By setting Flush-on, the system timer routine will flush the contents of the new filter into the keyboard buffer, thereby simulating the entry of a correct response by the student.

Finally, if none of the other special keystroke tests produced a match, the input keystroke is checked to see if it is a "make" "ALT W" keystroke (i.e., a downstroke on the "W" key while the ALT key is held down) (box 322). If so, a preselected coprocess is activated (box 326) if it has not already been turned on (box 324).

The other routines in the recording system, such as the System Timer Interrupt routine, as basically the same as the routines used in the training system. However, some of the development versions of the recording system include routines for monitoring the signal sent to the tape unit and routines for playing back the keystrokes recorded and checking them against a record of the keystrokes which should have been recorded. These extra routines, which could be written by one of ordinary skill in the art, are not included in production models of the recording system and are not necessary for the proper functioning of the recording system.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

COURSEWARE AUTHORING FILE

```
LESSON 'MYLESSON.PRG'
EVENT 1
  TIME='10'
  MATCH='30,22,59,60'
  HINT
  * * * * * * * * * * * * * *
  - remedial message -
  * * * * * * * * * * * * * * */
END EVENT 1
EVENT 2
  TIME='5'
  MATCH='55,35,36,60'
  HINT
  * * * * * * * * * * * * * *
  USE X TO EXIT
  * * * * * * * * * * * * * */
END EVENT 2
....
```

What is claimed is:

1. A software training authoring system comprising:
(a) a computer system including central process (CPU) means for executing computer programs, and keyboard means for entering data and commands into said computer system; and
(b) recording means for recording on a multiple channel recording medium an audio signal on a first channel and keystroke data on a second channel, said audio signal and keystroke data being recorded so that both can be produced simultaneously when said recording medium is read, said audio signal including oral instructions for explaining the usage of a predefined computer program, said keystroke data including keystrokes for use as input data and commands to said predefined computer program simultaneously with the reading of the corresponding oral instructions recorded on said first channel;
said computer system further including:
(c) recording control means, including
on/off software means for activating and deactivating said recording means; and
keystroke transmission means for sending keystroke data for use in said predefined computer program to said recording means for recording on said recording medium.

2. A software training authoring system as set forth in claim 1, wherein
said recording medium is a cassette tape having first and second tracks;
said audio signal is recorded on the first track of said cassette tape, and said keystroke data is recorded on the second track of said cassette tape; and
said recording means includes a stereo cassette tape transport in which a cassette tape having first and second prerecorded tracks can be mounted, including means for recording signals on said first and second tracks.

3. A software training authoring system as set forth in claim 1, further including
an interface for connecting said recording means to said computer system, including
means for enabling said computer system to activate and deactivate said said recording means; and
means for receiving keystroke data from said computer system and recording said keystroke data on said second channel of said recording medium.

4. A software training authoring system comprising:
(a) a computer system including
central process (CPU) means for executing computer programs;
keyboard means for entering data and commands into said computer system;
display means responsive to said CPU means for displaying messages; and
port means for connecting said CPU means to a peripheral device; and
(b) audio and keystroke signal handling means including,
recording means for recording on a multiple channel recording medium an audio signal on a first channel and keystroke data on a second channel, said audio signal and keystroke data being recorded so that both can be produced simultaneously when said recording medium is read, said audio signal including oral instructions for explaining the usage of a predefined computer program, said keystroke data including keystrokes corresponding to said oral instructions which are recorded for simultaneous access; and
playback means for producing output signals from said first and second channels of said recording medium and for making signals corresponding to audible sounds which have been recorded on said first channel available for transmission to a speaker; and
(c) an interface for connecting said playback means and recording means to said port means, including
means for enabling said computer system to activate and deactivate said playback means and said recording means; and
decoder means for receiving from said playback means keystroke data signals from said second channel of said recording medium, for decoding said keystroke data signals into binary keystroke data signals useable by a computer, and for enabling said computer system to receive said decoded keystroke data;
said computer system further including:
(d) tutorial control means, including
on/off software means for activating and deactivating said playback means and recording means;
keystroke transmission means for sending keystroke data for use in said predefined computer program through said port means for recording on said recording medium; and
keystroke receiving means for receiving keystroke data from said playback means and for passing at least some of said keystroke data to said computer system for use as though said keystroke data came from said keyboard means.

5. A software training authoring system as set forth in claim 4, wherein
said recording medium is a cassette tape having first and second tracks;
said audio signal is recorded on the first track of said cassette tape, and said keystroke data is recorded on the second track of said cassette tape; and
said audio and keystroke signal handling means includes a stereo cassette tape transport means in which a cassette tape having first and second prerecorded tracks can be mounted, including means for producing output signals from said first and second prerecorded tracks and for making signals corresponding to audible sounds which have been recorded on said first prerecorded track of a cassette tape mounted in said cassette tape transport available for transmission to a speaker.

6. A software training authoring system as set forth in claim 4, said tutorial control means including
 means for running a preselected computer program in said CPU means while said audio and keystroke signal handling means provides audio signals to a speaker and keystroke data to said computer system;
 courseware means defining a tutorial on how to use a preselected computer program, including a data base for defining a multiplicity of events, each said event defining a filter string and a timeout parameter, each said event corresponding to a preselected contextual circumstance in the running of said preselected computer program;
 filter means for comparing data from said keyboard with said filter string and for allowing said data from said keyboard to be further processed by said preselected computer program only if said data from said keyboard matches said filter string; and
 timer means for performing a predefined task if data which matches said filter string is not received from said keyboard during a time period corresponding to said timeout parameter.

7. A computer software training system as set forth in claim 4, said tutorial control means including
 keyboard control means for enabling and disabling the receipt of data from said keyboard means, including means for disabling the receipt of data from said keyboard means when said playback means is providing data to said computer system.

8. A method of writing a software training program, comprising the steps of:
 providing a multiple channel recording medium;
 recording on said multiple channel recording medium an audio signal on a first channel; and
 recording on said multiple channel recording medium keystroke data on a second channel;
 said audio signal and keystroke data being recorded so that both can be produced simultaneously when said recording medium is read, said audio signal including oral instructions for explaining the usage of a predefined computer program, said keystroke data including keystrokes for use as input data and commands to said predefined computer program simultaneously with the reading of the corresponding oral instructions recorded on said first channel.

9. A computer software training system comprising:
 (a) a computer system including central process (CPU) means for executing computer programs, keyboard means for entering data and commands into said computer system, display means responsive to said CPU means for displaying messages, and port means for connecting said CPU means to a peripheral device; and
 (b) playback means for providing an audio signal including oral instructions to a speaker, and for simultaneously providing keystroke data to said computer system;
  wherein said audio signal and said keystroke data have been recorded on separate first and second channels of a multiple channel recording medium, said audio signal and keystroke data being recorded so that both can be produced simultaneously when said recording medium is read, said audio signal including oral instructions for explaining the usage of a predefined computer program, said keystroke data including keystrokes corresponding to said oral instructions which are recorded for simultaneous access; and
  said playback means including means for producing output signals from said first and second channels of said recording medium and for making signals corresponding to audible sounds which have been recorded on said first channel available for transmission to a speaker; and
 (c) an interface for connecting said playback means and recording means to said port means, including means for enabling said computer system to activate and deactivate said playback means and said recording means; and
  decoder means for receiving from said playback means keystroke data signals from said second channel of said recording medium, for decoding said keystroke data signals into binary keystroke data signals useable by a computer, and for enabling said computer system to receive said decoded keystroke data;
 said computer system further including:
 (d) tutorial control means, including
  on/off software means for activating and deactivating said playback means; and
  keystroke receiving means for receiving keystroke data from said playback means and for passing at least some of said keystroke data to said computer system for use as though said keystroke data came from said keyboard means.

10. A computer software training system as set forth in claim 9, said tutorial control means including
 courseware means for defining a multiplicity of events, each said event defining a filter string and a timeout parameter;
 filter means for comparing data from said keyboard with said filter string and for allowing said data from said keyboard to be further processed by said computer system only if said data from said keyboard matches said filter string; and
 timer means for performing a predefined task if data which matches said filter string is not received from said keyboard during a time period corresponding to said timeout parameter.

11. A computer software training system as set forth in claim 9, said tutorial control means including
 means for running a preselected computer program in said CPU means while said audio and keystroke signal handling means provides audio signals to a speaker and keystroke data to said computer system;
 courseware means defining a tutorial on how to use a preselected computer program, including a data base for defining a multiplicity of events, each said event defining a filter string and a timeout parameter, each said event corresponding to a preselected contextual circumstance in the running of said preselected computer program;
 filter means for comparing data from said keyboard with said filter string and for allowing said data from said keyboard to be further processed by said preselected computer program only if said data from said keyboard matches said filter string; and
 timer means for performing a predefined task if data which matches said filter string is not received from said keyboard during a time period corresponding to said timeout parameter.

12. A computer software training system as set forth in claim 9, said tutorial control means including keyboard control means for enabling and disabling the receipt of data from said keyboard means, including means for disabling the receipt of data from said keyboard means when said playback means is providing data to said computer system.

* * * * *